United States Patent
Shrivastava et al.

(10) Patent No.: US 8,942,679 B2
(45) Date of Patent: Jan. 27, 2015

(54) METHOD AND SYSTEM FOR PROVIDING PATTERN BASED ENTERPRISE APPLICATIONS FOR ORGANIZING, AUTOMATING, AND SYNCHRONIZING PROCESSES FOR MOBILE COMMUNICATION DEVICES

(75) Inventors: Saurabh Shrivastava, Fremont, CA (US); Sridhar Tadepalli, Foster City, CA (US); Wayne Carter, Salt Lake City, UT (US); Rahim Yaseen, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 102 days.

(21) Appl. No.: 13/235,715

(22) Filed: Sep. 19, 2011

(65) Prior Publication Data
US 2012/0071146 A1 Mar. 22, 2012

Related U.S. Application Data

(60) Provisional application No. 61/384,150, filed on Sep. 17, 2010.

(51) Int. Cl.
*H04L 29/06* (2006.01)
*G06F 17/30* (2006.01)
*H04M 1/725* (2006.01)

(52) U.S. Cl.
CPC .... *G06F 17/30905* (2013.01); *G06F 17/30893* (2013.01); *H04M 1/72583* (2013.01)
USPC ..... 455/414.3; 455/418; 455/419; 455/550.1; 455/566

(58) Field of Classification Search
CPC ................... G06F 17/30893; G06F 17/30905; H04M 1/72583
USPC ........ 455/412.1–414.4, 425, 564, 550.1, 566, 455/158.44–158.5, 418, 466, 557, 461, 455/419; 379/88.17, 93.17, 201.04, 218.01, 379/352, 355.01, 88.01; 370/352, 355, 282; 709/246; 345/1.1, 173; 717/102, 128
See application file for complete search history.

(56) References Cited

U.S. PATENT DOCUMENTS

| | | | |
|---|---|---|---|
| 5,572,643 A | 11/1996 | Judson | 395/793 |
| 6,128,621 A | 10/2000 | Weisz | 707/103 |

(Continued)

FOREIGN PATENT DOCUMENTS

| | | | | |
|---|---|---|---|---|
| EP | 1 347 397 A2 | 9/2003 | | G06F 17/30 |
| EP | 1 956 481 A2 | 8/2008 | | G06F 9/44 |
| WO | WO 2008/101236 A1 | 8/2008 | | G06F 17/30 |

OTHER PUBLICATIONS

Cioroianu, Andrei, Senior Java Developer and Consultant, Devsphere, "Auto-Save JSF Forms with Ajax, Parts 1, 2, and 3," Aug. 7, 2007, 40 pages.

(Continued)

*Primary Examiner* — Babar Sarwar
(74) *Attorney, Agent, or Firm* — Campbell Stephenson LLP

(57) ABSTRACT

A method is disclosed in which a server generates and transmits a reply to a mobile device via a wireless communication link in response to receiving a request from a mobile device. The reply includes first pattern information and data elements retrieved from a logical data model. The mobile device renders a first page on a screen thereof in response to receiving the reply. The first page includes visual representations of the data elements, and the first page presents the visual representations in a first pattern corresponding to the first pattern information.

21 Claims, 13 Drawing Sheets

(56) References Cited

U.S. PATENT DOCUMENTS

| | | | |
|---|---|---|---|
| 6,268,856 B1 | 7/2001 | Bruck et al. | 345/357 |
| 6,327,628 B1 | 12/2001 | Anuff et al. | 719/311 |
| 6,684,370 B1 | 1/2004 | Sikorsky et al. | 715/205 |
| 6,748,569 B1 | 6/2004 | Brooke et al. | 715/207 |
| 6,763,343 B1 | 7/2004 | Brooke et al. | 717/115 |
| 6,859,820 B1 | 2/2005 | Hauduc et al. | 709/203 |
| 6,871,346 B1 | 3/2005 | Kumbalimutt et al. | 718/104 |
| 6,925,646 B1 | 8/2005 | Korenshtein | 719/328 |
| 6,964,014 B1 | 11/2005 | Parish | 715/205 |
| 6,987,987 B1 | 1/2006 | Vacanti et al. | 455/556.2 |
| 7,007,275 B1 | 2/2006 | Hanson et al. | 718/101 |
| 7,096,224 B2 | 8/2006 | Murthy et al. | 707/100 |
| 7,120,639 B1 | 10/2006 | de Jong et al. | 707/694 |
| 7,139,370 B1 * | 11/2006 | Tse | 379/88.17 |
| 7,546,602 B2 | 6/2009 | Hejlsberg et al. | 719/313 |
| 7,574,486 B1 | 8/2009 | Cheng et al. | 709/219 |
| 7,616,971 B2 * | 11/2009 | Rouse et al. | 455/566 |
| 7,747,782 B2 | 6/2010 | Hunt et al. | 709/246 |
| 7,907,966 B1 | 3/2011 | Mammen | 455/557 |
| 8,131,875 B1 | 3/2012 | Chen et al. | 709/246 |
| 8,191,040 B2 | 5/2012 | Hejlsberg et al. | 717/114 |
| 8,386,955 B1 | 2/2013 | Weber et al. | 715/781 |
| 2002/0046240 A1 | 4/2002 | Graham et al. | 709/203 |
| 2002/0078165 A1 | 6/2002 | Genty et al. | 709/217 |
| 2002/0140731 A1 | 10/2002 | Subramaniam et al. | 345/762 |
| 2003/0187984 A1 | 10/2003 | Banavar et al. | 709/225 |
| 2003/0191685 A1 | 10/2003 | Reese | 705/14 |
| 2004/0110490 A1 | 6/2004 | Steele et al. | 455/412.1 |
| 2004/0181467 A1 | 9/2004 | Raiyani et al. | 705/28 |
| 2004/0204116 A1 | 10/2004 | Ben-Efraim et al. | 455/104.1 |
| 2004/0220946 A1 | 11/2004 | Krishnaprasad et al. | 707/100 |
| 2005/0003810 A1 | 1/2005 | Chu et al. | 455/418 |
| 2005/0015375 A1 | 1/2005 | Harjanto | 707/10 |
| 2005/0015513 A1 | 1/2005 | Tran | 709/246 |
| 2005/0060277 A1 | 3/2005 | Zlatanov et al. | 707/1 |
| 2005/0091272 A1 | 4/2005 | Smith et al. | 707/104.1 |
| 2005/0097526 A1 | 5/2005 | Hauduc et al. | 717/136 |
| 2005/0102281 A1 | 5/2005 | Takahashi | 707/3 |
| 2005/0188353 A1 | 8/2005 | Hasson et al. | 717/116 |
| 2005/0216501 A1 | 9/2005 | Cengiz et al. | 707/103 R |
| 2006/0059225 A1 | 3/2006 | Stonehocker et al. | 709/202 |
| 2006/0143193 A1 | 6/2006 | Thakkar et al. | 707/100 |
| 2006/0173873 A1 | 8/2006 | Prompt et al. | 707/100 |
| 2006/0277271 A1 | 12/2006 | Morse et al. | 709/217 |
| 2006/0288280 A1 | 12/2006 | Makela | 715/530 |
| 2007/0061779 A1 | 3/2007 | Dowedeit et al. | 717/120 |
| 2007/0100967 A1 | 5/2007 | Smith et al. | 709/219 |
| 2007/0150610 A1 | 6/2007 | Vassilev et al. | 709/230 |
| 2007/0174330 A1 | 7/2007 | Fox et al. | 707/102 |
| 2007/0214170 A1 | 9/2007 | Lin | 707/102 |
| 2007/0220158 A1 | 9/2007 | Tolgu et al. | 709/230 |
| 2007/0300237 A1 | 12/2007 | Neil et al. | 719/319 |
| 2008/0098018 A1 | 4/2008 | King et al. | 701/101 |
| 2008/0172608 A1 | 7/2008 | Patrawala et al. | 715/255 |
| 2008/0183758 A1 | 7/2008 | Kennedy | 707/104.1 |
| 2008/0222242 A1 | 9/2008 | Weiss et al. | 709/203 |
| 2008/0222269 A1 | 9/2008 | Major et al. | 709/217 |
| 2008/0281866 A1 | 11/2008 | Claussen et al. | 707/103 Y |
| 2009/0003603 A1 | 1/2009 | Wessel et al. | 380/255 |
| 2009/0005122 A1 | 1/2009 | Goldfarb | 455/564 |
| 2009/0070667 A1 | 3/2009 | Zlatanov et al. | 715/243 |
| 2009/0070744 A1 * | 3/2009 | Taylor et al. | 717/128 |
| 2009/0094417 A1 | 4/2009 | Carlson et al. | 711/137 |
| 2009/0100096 A1 | 4/2009 | Erlichson et al. | 707/104.1 |
| 2009/0172101 A1 | 7/2009 | Arthursson | 709/205 |
| 2009/0177685 A1 | 7/2009 | Ellis et al. | |
| 2009/0193141 A1 | 7/2009 | Suresh | 709/235 |
| 2009/0254611 A1 | 10/2009 | Pena et al. | 709/203 |
| 2010/0010671 A1 | 1/2010 | Miyamoto | 700/247 |
| 2010/0049984 A1 | 2/2010 | Masushio et al. | 713/179 |
| 2010/0083277 A1 | 4/2010 | Malladi et al. | 719/313 |
| 2010/0174602 A1 | 7/2010 | Zweben et al. | 705/14.41 |
| 2010/0174717 A1 | 7/2010 | Fambon et al. | 707/741 |
| 2010/0191777 A1 | 7/2010 | Ylonen | 707/803 |
| 2010/0228880 A1 | 9/2010 | Hunt et al. | 709/246 |
| 2010/0235473 A1 | 9/2010 | Koren et al. | 709/219 |
| 2010/0262780 A1 | 10/2010 | Mahan et al. | 711/118 |
| 2010/0299438 A1 | 11/2010 | Zimmerman et al. | 709/226 |
| 2010/0299588 A1 | 11/2010 | Dattilo et al. | 715/234 |
| 2010/0332586 A1 | 12/2010 | Jogand-Coulomb et al. | 709/203 |
| 2010/0333153 A1 | 12/2010 | Sahota et al. | 725/97 |
| 2012/0047445 A1 | 2/2012 | Rajagopal | 715/747 |
| 2012/0071155 A1 | 3/2012 | Carter et al. | 455/422.1 |
| 2012/0072477 A1 | 3/2012 | Carter et al. | 709/201 |
| 2012/0072498 A1 | 3/2012 | Carter et al. | 709/204 |
| 2012/0079009 A1 | 3/2012 | Carter et al. | 709/203 |
| 2012/0079367 A1 | 3/2012 | Carter et al. | 709/201 |
| 2012/0089695 A1 | 4/2012 | Fainberg et al. | 709/213 |
| 2012/0124163 A1 | 5/2012 | Carter et al. | 709/217 |
| 2012/0151000 A1 | 6/2012 | Snodgrass et al. | 709/217 |
| 2013/0007016 A1 | 1/2013 | Saxena | 707/748 |
| 2013/0282986 A1 | 10/2013 | Allen et al. | 711/137 |

OTHER PUBLICATIONS

Genest, Aaron et al., Looking Ahead: Comparison of Page Preview Techniques for Goal-Directed Web Navigation, International Federation for Information Processing, 2009, pp. 378-391, (14 pages).

Jones, Robert, "Creating Web Content for Mobile Phone Browsers, Part 1," Feb. 6, 2004; pp. 1-7, (7 pages).

Cooperman, Gene et al., "Marshalgen: Marshaling Objects in the Presence of Polymorphism", College of Computer and Information Science, 161 CN; Northeastern University, Boston, MA; MA IPPS/SPDP;1999; pp. 616-622 (7 pages).

* cited by examiner

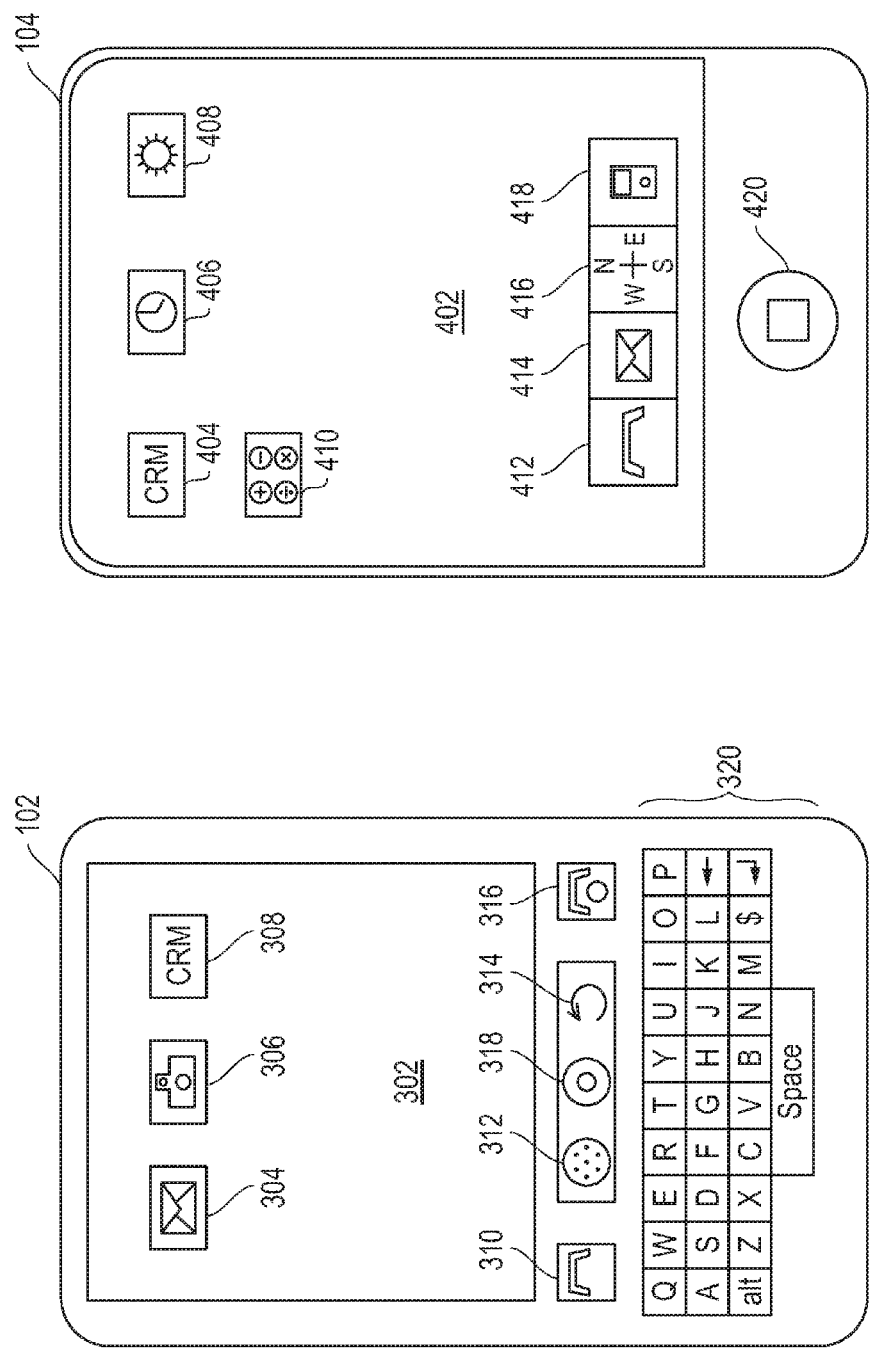

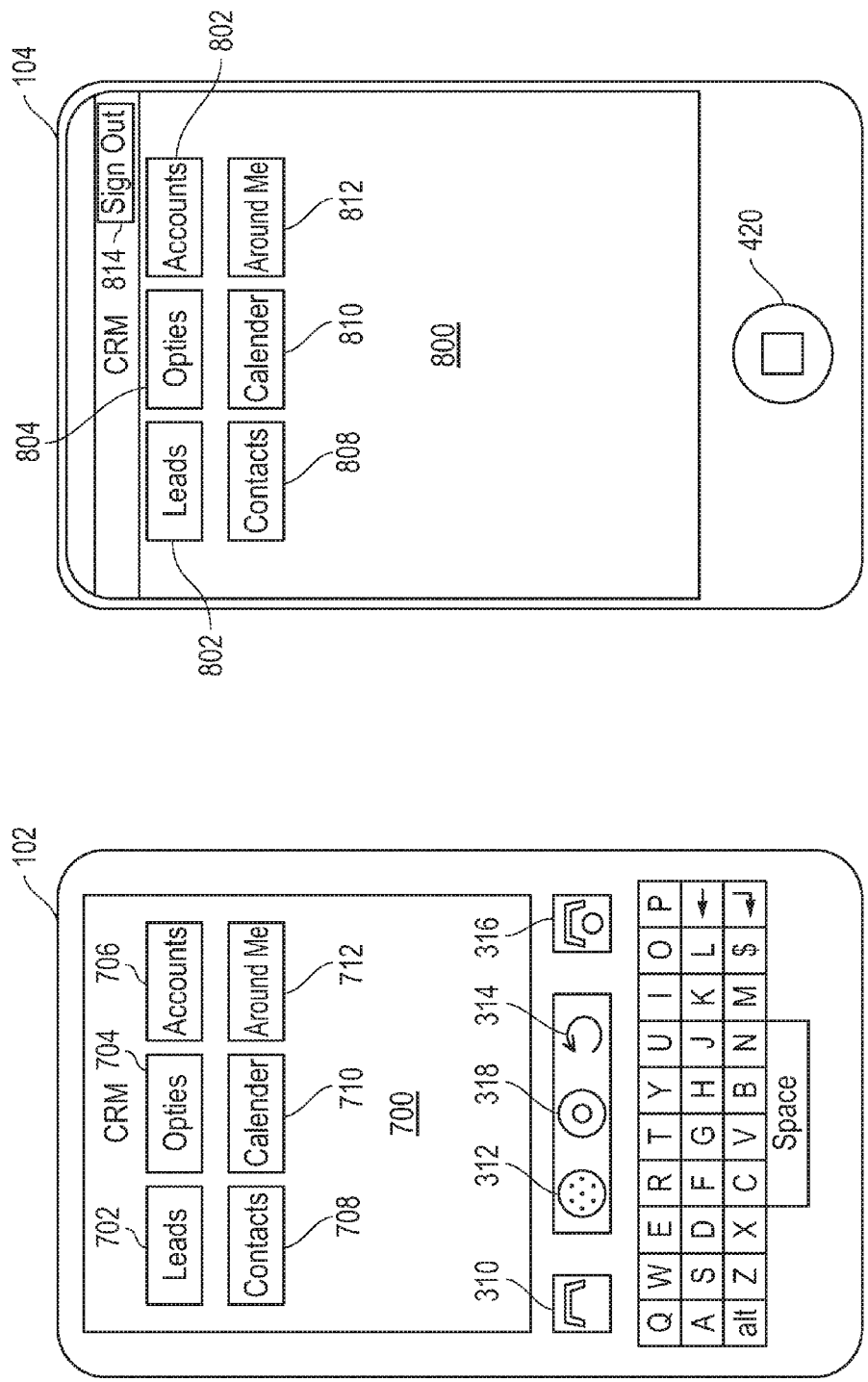

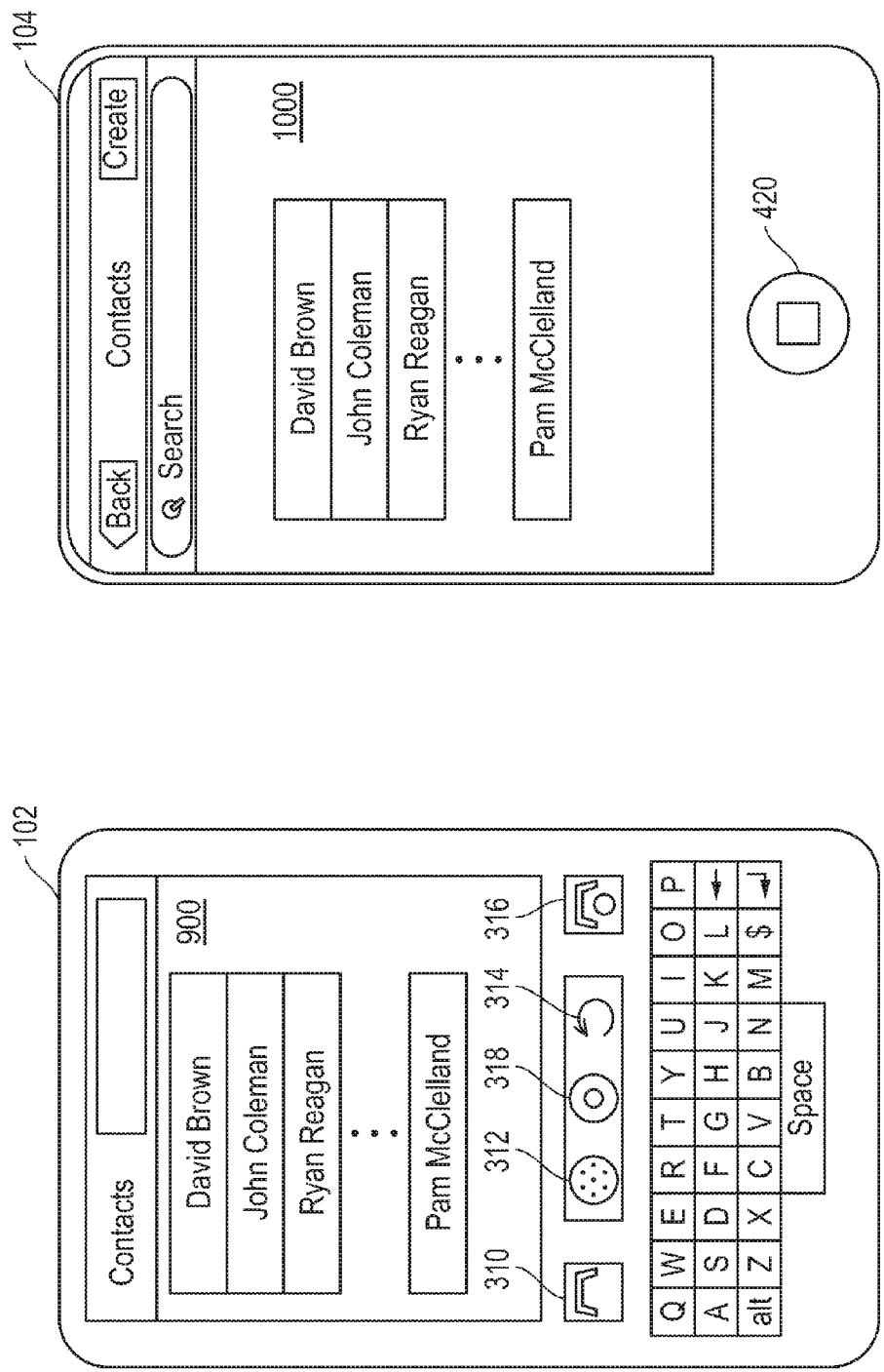

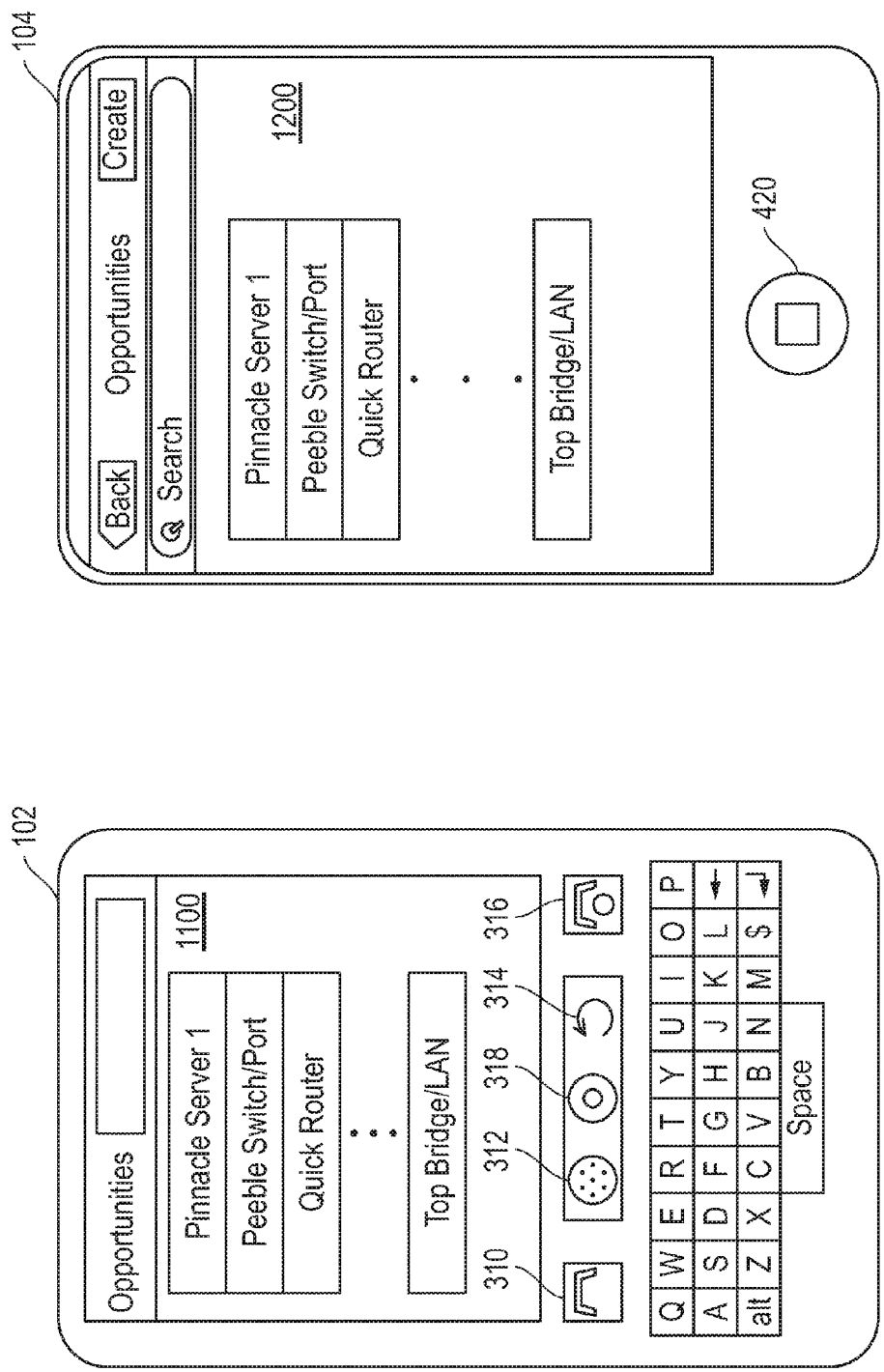

METHOD AND SYSTEM FOR PROVIDING PATTERN BASED ENTERPRISE APPLICATIONS FOR ORGANIZING, AUTOMATING, AND SYNCHRONIZING PROCESSES FOR MOBILE COMMUNICATION DEVICES

CROSS-REFERENCE TO RELATED APPLICATIONS

This application claims priority to Provisional Application No. 61/384,150 filed on Sep. 17, 2010, and is incorporated herein in its entirety by reference.

BACKGROUND OF THE INVENTION

Enterprise applications are integral parts of many businesses and provide valuable services to its users. For example, enterprise applications provide customer relationship management (CRM), resource planning, human resource management, etc. The present invention will be described with reference to an example CRM that provides sales and marketing services to its users, it being understood that the present invention should not be limited thereto.

CRM is a widely implemented strategy for managing a company's interaction with customers, clients, and sales prospects. CRM involves technology to organize, automate, and synchronize business processes-principally sales activities, but also those for marketing, customer service, and technical support. The overall goals of CRM are to find, attract, and win new clients, nurture and retain those the company already has, etc.

CRM services can be accessed by users via a desktop computer system that is coupled to a data processing system the implements the CRM. CRM services can also be accessed through mobile devices (e.g., smart phones or tablet computers). The present invention will be described with reference to providing CRM services to users via their mobile devices, it being understood that the present invention should not be limited thereto.

SUMMARY

A method is disclosed in which a server generates and transmits a reply to a mobile device via a wireless communication link in response to receiving a request from a mobile device. The reply includes first pattern information and data elements retrieved from a logical data model. The mobile device renders a first page on a screen thereof in response to receiving the reply. The first page includes visual representations of the data elements, and the first page presents the visual representations in a first pattern corresponding to the first pattern information.

BRIEF DESCRIPTION OF THE DRAWINGS

The present invention may be better understood, and its numerous objects, features, and advantages made apparent to those skilled in the art by referencing the accompanying drawings.

FIG. 3 graphically illustrates external components of a mobile device that can be employed in the system of FIG. 1.

FIG. 4 graphically illustrates external components of another mobile device that can be employed in the system of FIG. 1.

FIG. 7 illustrates an example page that is rendered on the screen of the mobile device shown in FIG. 3.

FIG. 8 illustrates an example page that is rendered on the screen of the mobile device shown in FIG. 4.

FIG. 9 illustrates an example page that is rendered on the screen of the mobile device shown in FIG. 3.

FIG. 10 illustrates an example page that is rendered on the screen of the mobile device shown in FIG. 4.

FIG. 11 illustrates an example page that is rendered on the screen of the mobile device shown in FIG. 3.

FIG. 12 illustrates an example page that is rendered on the screen of the mobile device shown in FIG. 4.

FIG. 15 illustrates an example page that is rendered on the screen of the mobile device shown in FIG. 3.

FIG. 16 illustrates an example page that is rendered on the screen of the mobile device shown in FIG. 4.

The use of the same reference symbols in different drawings indicates similar or identical items.

DETAILED DESCRIPTION

Today's sales and marketing workforce is more mobile than ever. To reduce sales downtime, increase customer face time, and win more deals, many companies now employ mobile CRM to move their business forward while employees are on the road. Mobile CRM enable users to more efficiently use CRM services such creating, reviewing, and/or updating sales opportunities, contacts, leads, calendar entries, etc., through user interfaces (UIs) or pages displayed on their mobile devices.

Mobile CRM can be complicated and difficult to use especially for those users in sales or marketing who lack information technology skills. With this in mind, mobile CRM should be designed so its use is more intuitive. This goal can be promoted if many or all mobile CRM pages are displayed on mobile devices using a small number of familiar patterns. To illustrate, CRMs provide access to many different types of business objects such as sales opportunities, leads, contacts, accounts, etc. Suppose a user wishes to view information regarding an opportunity, but the user lacks the technical skills or familiarity with a CRM to navigate through a complex hierarchy of menus in order to find the opportunity of interest. An easier and perhaps more efficient option would be to simply display a page on the user's mobile device with a list of opportunities that a user can visually scan for an opportunity of interest. Similarly, a page can be displayed on a mobile device as a list pattern of accounts that a user can visually scan for an account of interest. A form is another type of pattern that is familiar to users that can be used in mobile CRM. A page to review or modify a business object (e.g., a lead) can be displayed on a mobile device in a form pattern with fields containing data of the opportunity. If mobile CRM pages are displayed using familiar patterns, mobile CRM should be more intuitive to lay users. Further, intuitiveness can be enhanced if pages can be displayed with a look and feel that is native to the mobile devices. These aspects and others will be more fully described below.

Figure 1:
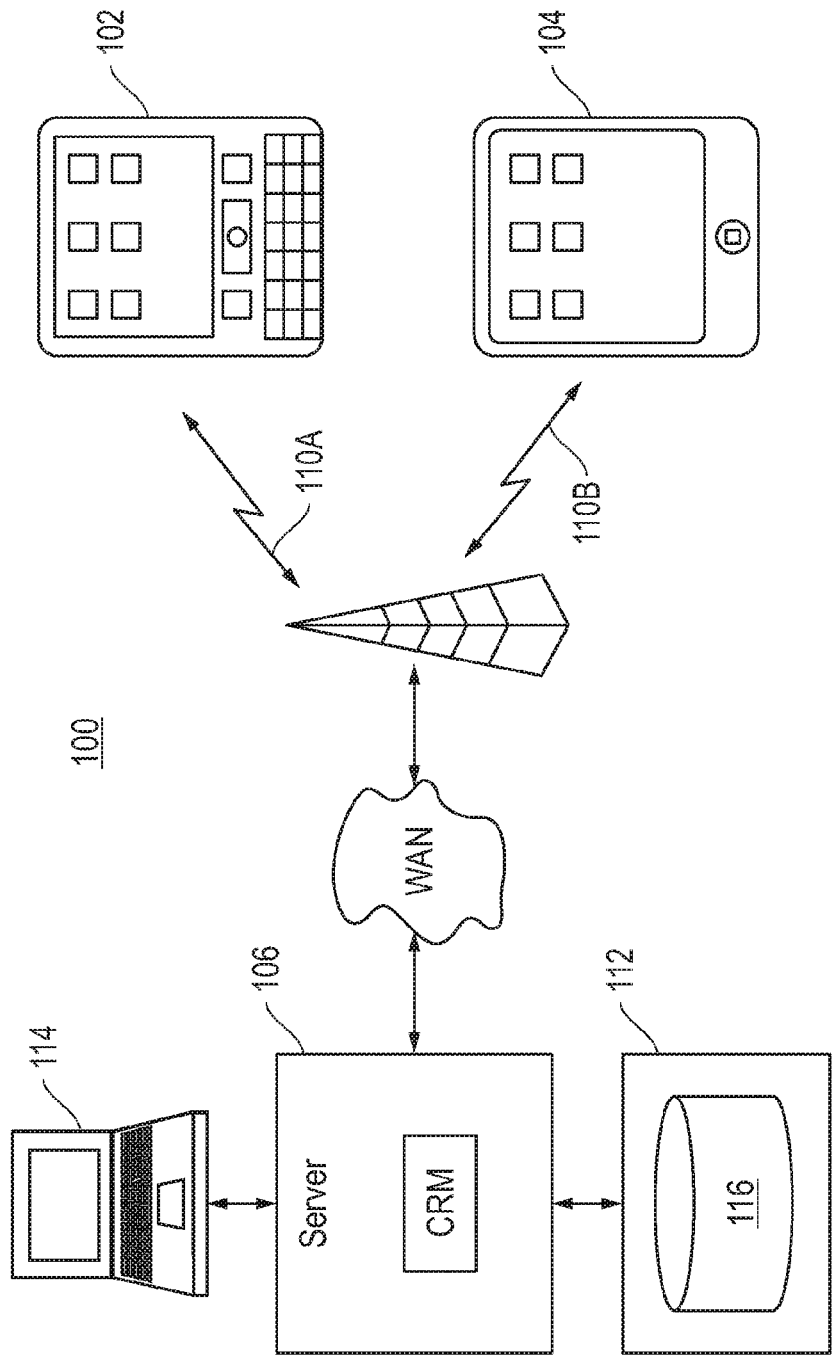
FIG. 1 graphically illustrates relevant components of an example system that employs a CRM.

FIG. 1 illustrates in block diagram form, relevant components of a system 100 that provides an example mobile CRM. System 100 includes mobile devices (e.g., smart phones) 102 and 104 in wireless communication with a CRM executing on server 106. Computer system 114 enables an administrator to declaratively create and/or modify the CRM or portions thereof.

Services provided by the CRM can be accessed via user interfaces (hereinafter also referred to as pages) sent by server 106 and displayed by mobile devices 102 or 104. As will be more fully described below, the CRM operates with mobile devices 102 and 104, which are substantially different in design and operation. In other words, the CRM is designed to be independent of mobile device features including look and feel. System 100 also includes a computer system 114 in data communication with server 106.

The example CRM implements a model-view-controller architecture that includes a single, metadata driven application, which contains multiple page definitions or views. In response to receiving a page request from mobile device 102 or 104, the CRM merges or binds data of a logical data model with a selected page definition, the result of which is serialized and sent to the mobile device 102 or 104 as a reply to its request. Mobile device 102 or 104 receives the reply, deserializes content and renders a corresponding page for display that includes visual representations of the merged data and other components. The page can be displayed with a look and feel that is native to the mobile device 102 or 104.

The CRM executing on server 106 is in data communication with a storage system 112 that includes one or more relational databases 116, which in turn store data of business objects of a logical data model. A business object may represent a logical entity that stores a set of instance variables or properties, also known as attributes, and associations with other business objects, thereby weaving a map of objects representing business relationships. A business object may represent a data entity that may contain related data held in many tables of the relational database 116. A business object may be made of business components that map to these tables. A business object is an object type that glues related business components together. A business component is said to provide a layer of wrapping over the tables. Opportunities, accounts, and contacts are examples of business objects.

Figure 2:
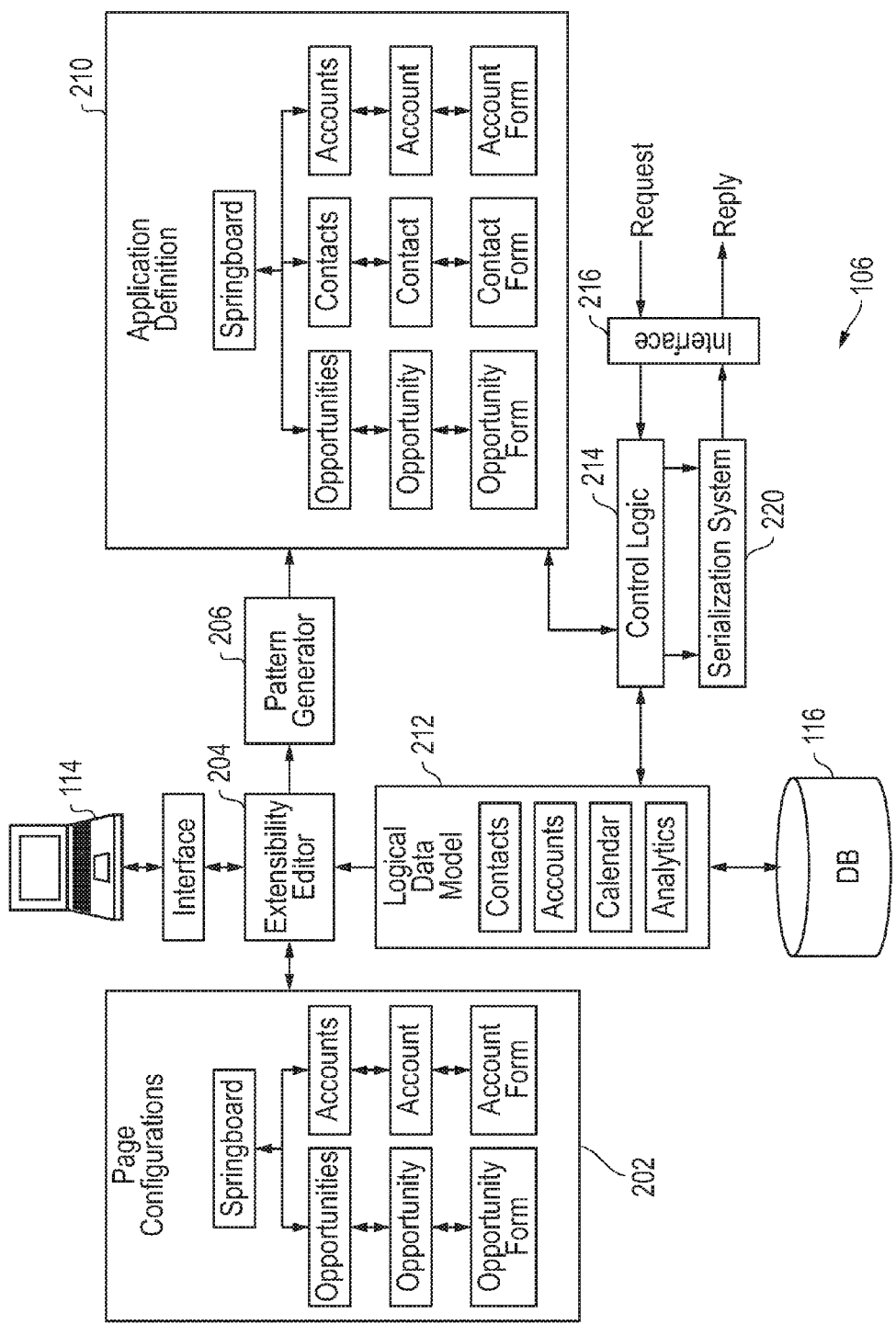
FIG. 2 graphically illustrates relevant components of an example server that can be employed in the system of FIG. 1.

FIG. 2 illustrates an example of server 106 from FIG. 1 with relevant components shown in block diagram form. More particularly, server 106 includes a memory 202 that stores page configurations, each of which may include a pattern definition. An extensibility editor 204, which may take form in instructions executing on processor, is configured to create and/or modify one or more page configurations stored within memory 202 in accordance with instructions received from an administrator via an extensibility editor interface displayed by computer system 114. A pattern generator 206, which may take form in instructions executing on processor, is configured to process the page configurations in memory 202 and generate corresponding page definitions. Pattern-Base Construction And Extension Of Enterprise Application In A Cloud Computing Environment, which was filed Sep. 19, 2011, which claims priority to 61/384,086, and which is incorporated herein by reference, provides one or more examples of a method for generate page definitions. Once generated, the page definitions are stored within memory 210 as components of an application definition for the CRM. Example page definitions are visually represented along with flow relationships therebetween. Page definitions (also known as "views") form the basis of pages that are displayed by mobile devices 102 or 104.

The application definition in memory 210 can be designed using Java Server Faces (JSF) technology, it being understood the present invention should not be limited thereto. JSF defines a standard framework for building components, including page definitions, for enterprise applications. JSF can also be used to define page flow within the application definition, map page definitions to a data model, etc. While page definitions run on server 106, they are displayed on mobile devices 102 or 104 after serialization and subsequent transmission.

With continuing reference to FIG. 2, server 106 includes a logical data model 212. Page definitions can be used to render logical data model 212 into a form suitable for interaction by a user of a mobile device via a page displayed thereon. Multiple page definitions can exist for a single logical data model 212 for different purposes. Memory 210 illustrates graphical representations of example page definitions and flow relationships therebetween. The "springboard" page definition can be used to render a page with icons arranged in a two-dimensional pattern. Each icon may represent a mini-application or high level business object within the logical data model. The "accounts," "opportunities," and "contacts" page definitions can be used to render pages with names or other information of accounts, opportunities, and contacts, respectively, in a list pattern. The "account," "opportunity," and "contact" page definitions can be used to render pages with data from an account, opportunity, and contact, respectively, in a form pattern. The "account form," "opportunity form," and "contact form" page definitions can be used to render pages with data from an account, opportunity, and contact, respectively, in a user editable form pattern. Other page definitions in memory 202 are contemplated.

Logical data model 212 manages the data of the application definition, responds to requests for information about its state (usually from a page definition), and responds to instructions to change state from control logic 214. In one sense, logical data model 212 provides access to business objects such as contacts, opportunities, analytics, etc., or other information such as identities of business objects. The logical data model 212 can be both the data and the business/domain logic needed to manipulate the data.

Control logic 214 is in data communication with the application definition contained within memory 210 in addition to being in data communication with interface 216 and serialization system 220. Control logic 214 accepts data input from a user via mobile device 102 or 104 and instructs the logical data model 212 to perform actions (e.g., update an opportunity) based on that data input. In response to receiving a page request from mobile device 102 or 104 via interface 216, control logic 214 may access the application definition in memory 210 to identify and retrieve a copy of the appropriate page definition, or relevant components thereof, which is needed to form a reply to the page request. The page definition retrieved from memory 210 is selected based on information contained in the page request and may contain metadata that is used to retrieve data of the logical data model 204. The page definition retrieved from memory 212 may contain metadata that can be used to select data from the logical data model 212.

Control logic 214 can make calls on business objects of logical data model 212 to retrieve data. The page definition is merged with data from model 204, the result of which is serialized by serialization system 212 and subsequently transmitted to the requesting mobile device in a reply. The serialization system 220 has the ability to interpret and serialize the page definitions according to the requirements of different types of mobile devices. Thus, the serialization system 220 may be able to serialize a reply into an output that has one format (e.g., Property List or Plist) for mobile device 104, and serialize the same reply into an output that has a different format (e.g., JavaScript Object Notation or JSON) for mobile device 102. Ultimately, the requesting mobile device receives the reply, deserializers its content, and displays a corresponding page. FIGS. 5-14 illustrate example pages that are displayed by mobile devices 102 and 104. As more fully described below, different CRM clients executing on the mobile devices know how to interpret pattern definitions identified in the serialized page definitions when generating the pages for display.

Each of mobile devices 102 and 104, although different in design and operation, can implement common functions such as email, cell phone, etc. FIGS. 3 and 4 illustrate relevant external features of mobile devices 102 and 104, which are distinct in design. Mobile device 102 includes a hard or physical keyboard, while mobile device 104 includes a soft keyboard (not shown). Mobile device 104 may include soft buttons displayed on a touch sensitive display screen. Mobile device 102 lacks a touch sensitive screen. Rather, mobile device 102 includes a trackball and multiple, dedicated physical buttons. Although different in many aspects, mobile devices 102 and 104 are sized to fit in the front or back pocket of a normal pair of adult sized pants, it being understood that the present invention can find application with respect to larger devices such as tablet computers.

With continuing reference to FIG. 2, mobile device 102 as shown in FIG. 3 includes a screen 302 that displays icons corresponding to different applications including icon 308 that corresponds to the CRM executing on server 106. In addition, mobile device 102 includes physical buttons 310-316, a trackball 318, and a physical keyboard 320. A trackball is a pointing device consisting of a ball held by a socket containing sensors to detect a rotation of the ball about two axes—like an upside-down mouse with an exposed protruding ball. The user rolls the ball with the thumb, fingers, or the palm of the hand to move a cursor across screen 302 to reach active buttons or icons. When the curser reaches an active button or icon displayed on the screen 302, the user can activate the button or icon by depressing trackball 318. Another native feature of mobile device 102 is the display of a menu on screen 320 when the trackball is depressed.

In contrast, mobile device 104 lacks multiple, dedicated physical buttons and a physical keyboard. Rather, mobile device 104 has a single physical button 420 and a touch sensitive display screen 402 with icons 404-408 displayed therein. Like the icons shown in FIG. 3, the icons shown in FIG. 4 correspond to respective applications including icon 404 that corresponds to the CRM on server 106. Mobile device 104 in FIG. 4 includes several soft buttons 412-418, but only one physical button 420. A user can activate a soft button or icon by simply by touching it. Although not shown, a soft keyboard can be displayed.

Figure 5:
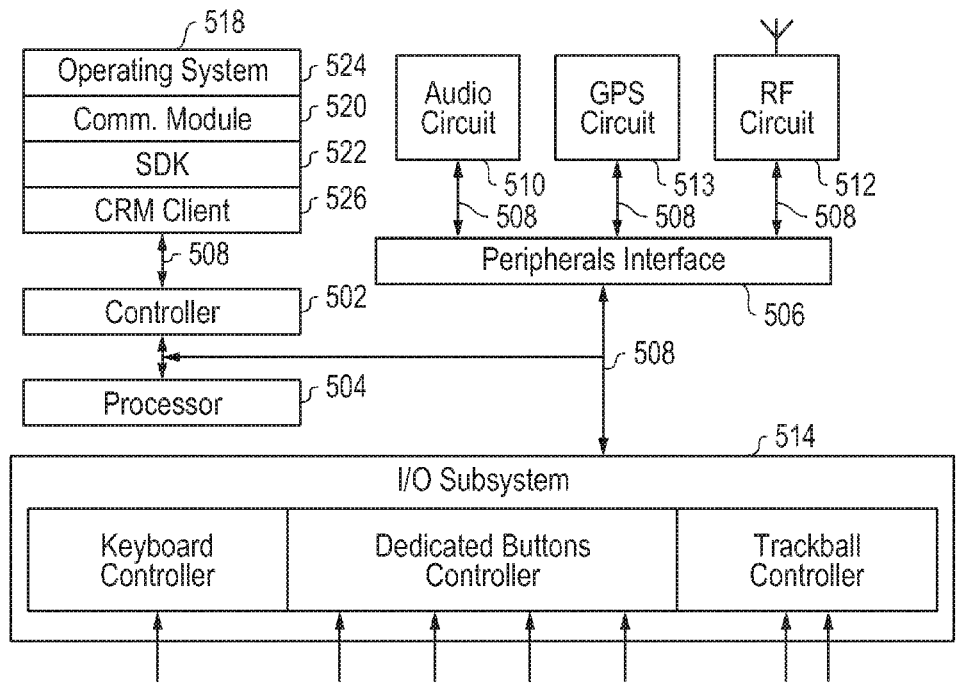
FIG. 5 graphically illustrates internal components of the mobile device shown in FIG. 3.
Figure 6:
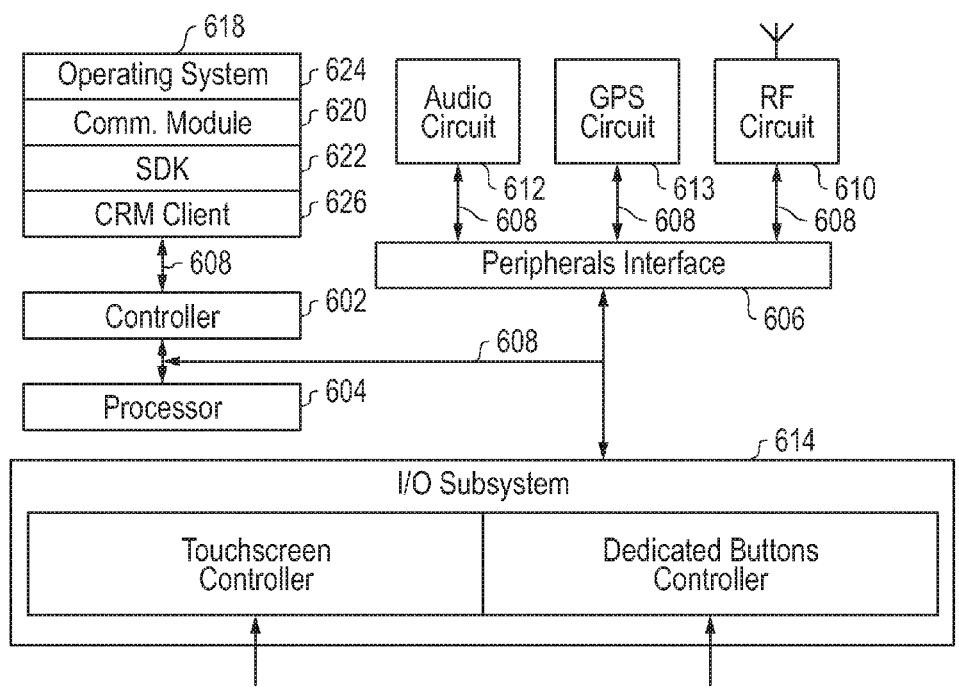
FIG. 6 graphically illustrates external components of the mobile device shown in FIG. 4.

FIGS. 5 and 6 illustrate relevant internal components of the mobile devices 102 and 104, respectively, in block diagram form. At first glance, mobile devices 102 and 104 contain similar components. However, corresponding components in mobile devices 102 and 103 can operate alone or in conjunction with each other in substantially different ways.

With continuing reference to FIG. 3, mobile device 102 of FIG. 5 includes a memory controller 502 coupled to a processor 504 and a peripherals interface 506. The various components of mobile device 102 may be coupled by one or more communication buses or signal lines 508. The peripherals interface 506 is coupled to radio frequency (RF) circuit 510, audio circuit 512, and global positioning system (GPS) circuit 513. The GPS circuit 513 supports a location determining capability and can provide the longitude and latitude of mobile device 102 upon request.

The peripherals interface 502 is coupled to an I/O subsystem 514 that contains various controllers that interact with other components of mobile device 102. I/O subsystem 514 includes a keyboard controller coupled to receive input from the physical keyboard 320. The trackball controller is coupled to receive input from the trackball 318. And dedicated buttons controllers receive respective inputs from dedicated buttons 310-316.

Memory controller 502 is coupled to memory 518, which may take form in one or more types of computer readable medium. Memory 518 stores several software components or modules including a communication module that provides communication procedures, which enable communication between mobile device 102 and server 106 via a wireless communication link 110A shown in FIG. 1. Memory 518 may also include a software development kit (SDK) 522, an operating system 524, and a set of applications including CRM client 526 as shown. Components in memory 518 may support email service, texting, mapping, etc. Other components in memory 518 may support email, texting, mapping, etc. The CRM client 526, as will be more fully described below, operates in conjunction with other modules (e.g., operating system 524, etc.) shown within FIG. 5 to render a page provided by server 106, create a request for a subsequent page, issue instructions to initiate functions such as email, cell phone, etc.

With continuing reference to FIG. 4, mobile device 104 of FIG. 6 includes a memory controller 602 coupled to a processor 604 and a peripherals interface 606. Like mobile device 102, the various components of mobile device 104 may be coupled by one or more communication buses or signal lines 608. The peripherals interface 606 is coupled to RF circuit 610, audio circuit 612, and global positioning system (GPS) circuit 613, which supports location determining capabilities.

The peripherals interface 602 is coupled to an I/O subsystem 614 that contains various controllers that interact with other components of mobile device 104. I/O subsystem 614 includes a touch screen controller that is coupled to the touch sensitive display screen 404 shown in FIG. 4. The touch screen controller may detect contact and any movement or break thereof.

Memory controller 602 is coupled to memory 618, which may take form in one or more types of computer readable medium. Memory 618 stores several software components or modules including a communication module that provides communication procedures, which enable communication between mobile device 104 and server 106 via wireless communication link 110B shown in FIG. 1. Memory 618 may also include an SDK 622, an operating system 624, and a set of applications including CRM client 626 as shown. Other components in memory 618 may support email service, texting, etc. The CRM client 626, as will be more fully described below, operates in conjunction with modules shown within FIG. 6 to display a page provided by server 106, create a request for a subsequent page, issue instructions to initiate functions such as email, cell phone, mapping, etc.

CRM client 626 of mobile device 104 is substantially different than the CRM client 526 of mobile device 102. The differences between clients 526 and 626 enable the same page requested from the CRM to be displayed with a look and feel that is native to mobile devices 102 and 104, respectively, and similar to the look and feel of pages displayed by other applications in memory 518 and 618, respectively. Look and feel is a term used to describe aspects of page design, including elements such as colors, shapes, layout, and typefaces (the "look"), as well as the behavior of dynamic elements such as buttons, boxes, and menus (the "feel").

With continuing reference to FIG. 2, mobile devices 102 and 104 display pages on their respective screens in accordance with serialized replies received on request from the CRM of server 106. The replies are based on page definitions of the CRM do not take into account the look and feel aspects of mobile devices including mobile devices 102 and 104. In other words, the page definitions are independent of the look and feel of mobile devices 102 and 104. Corresponding pages displayed on mobile devices 102 and 104 are not identical, even though they are created from the same page definition. Many of the differences in corresponding pages may account for differences in the native look and feel of mobile devices 102 and 104.

Page definitions in memory 210 are created by pattern generator 206 as a function of page configurations stored in configuration memory 202. Most if not all of the page definitions include a pattern definition. There can be several different types of pattern definitions. A pattern can be seen as a type of theme of recurring objects, sometimes referred to as elements of a set of objects. Example patterns include a springboard pattern, a list pattern, a form pattern, an editable form (eform) pattern, a carousel pattern, etc. The pattern definitions in one embodiment, exhibit designer intent of how a mobile device should render elements in a displayed page. The pattern definitions are independent of the look and feel aspects of mobile devices including mobile devices 102 and 104. Rather, a pattern definition represents the intent of how elements should be displayed. CRM clients 526 and 626 described above can interpret the intent behind the patterns and cooperate with the native components of the mobile devices when displaying pages in accordance with the patterns and respective native look and feel.

FIGS. 7-16 illustrate example patterns in pages displayed on mobile devices 102 and 104. FIGS. 7 and 8 illustrate pages 700 and 800 that are rendered on the displays of mobile devices 102 and 104, respectively, after user activation of CRM icons 308 and 410 on the interfaces shown within FIGS. 3 and 4, respectively. Mobile devices 102 and 104 generate and send a request to server 106 for the "Springboard Page" in response to user activation of icons 308 and 410, respectively. Each of displays 700 and 800 illustrate an example springboard pattern. The springboard pattern illustrated in pages 700 and 800 represent an intent to display objects in a two dimensional array. Icons in pages 700 and 800 correspond to respective high level business objects of logical data model 212 or mini applications of the CRM.

Corresponding pages (e.g., pages 700 and 800) displayed on mobile devices 102 and 104 are not identical, even though they are created from the same page definition, and thus in accordance with the same pattern definition thereof. Many of the differences in corresponding pages may account for differences in the native look and feel of mobile devices 102 and 104. For example, pages 700 and 800 employ the same two-dimensional springboard pattern to display icons representing high level business objects of logical data model 212. But, springboard page 800 includes a soft sign-out button 814 that, when activated, terminates the CRM session and returns mobile device 104 back to the state it occupied as illustrated in FIG. 4; display 700 does not include a soft button that performs the same function. Rather, a user can activate the same "sign out" function by, for example, activating the "Back" button 316.

Icons 702-712 and 802-812 of pages 700 and 800 correspond to high level business objects or mini applications of the mobile CRM on server 106. These icons are actionable. With continuing reference to FIGS. 7 and 8, FIGS. 9 and 10 illustrate example pages 900 and 1000 rendered on the display screens of mobile devices 102 and 104, respectively, in response to a user activation of the "Contacts" icons 708 and 808, respectively.

When users activate the Contacts icons 706 and 806, mobile devices 102 and 104 generate and send respective requests to server 106 for the "Contacts" page. Server 106 returns separate replies that contain serializations of the same Contacts page definition merged with data of data model 212. Mobile devices 102 and 104 render pages 900 and 1000 in response to receiving their respective replies. Pages 900 and 1000 present contacts in a "list" pattern. Even though pages 900 and 1000 present a list pattern of contacts, the pages have features that comply with the look and feel of mobile devices 102 and 104, respectively. Contacts page 1000 contains soft "Back" and "Create" buttons. Mobile device 104 redisplays the immediate prior page when the Back button is activated. Mobile device 104 enables the user to create a new entry (e.g., a new contact) when the Create button is activated. Users of mobile device 104 should be more familiar with the "Create" and "Back" buttons and their function if they have previously used other applications that employ the same Create and Back buttons in the same page position. Mobile device 102 can implement the same back and create functions, but the functions are activated in a substantially different way. Instead of a soft "Back" button, mobile device 102 has a physical "Back" button 314. Mobile device 102 can also implement the function of creating a new entry in a list, but the create function is implemented after the user selects an appropriate menu option after a menu is displayed when the user depresses trackball 318. Again, users of mobile device 104 should be familiar with the menu driven option to create a new entry if this feature is common to other applications implemented by mobile device 102. Further look and feel differences exist between corresponding pages 900 and 1000. Both pages include a field into which a user can enter a search term (e.g., a specific contact name). The search field in page 900 is positioned toward the side of the page title "Contacts," whereas the search field in page 100 is positioned beneath the page title "Contacts." Further, the size and shape of the search fields differ in pages 900 and 1000, and the field in page 100 is designated with "Search."

As a further illustrative example of a list pattern, FIGS. 11 and 12 show example "Opportunities" pages 1100 and 1200 displayed by mobile devices 102 and 104, respectively, after icons 704 and 804 shown in FIGS. 7 and 8 are activated and mobile devices transmit requests to server 106. These pages are rendered after server 106 return respective replies that contain serializations of the same Opportunities page definition merged with data from data model 212. Like other pages presented in a list pattern, pages 1100 and 1200 illustrate an intent to display elements (e.g., opportunities) in a list. The Opportunities pages 1100 and 1200 also have the same look and feel of Contacts pages 900 and 1000, respectively.

Figure 14:
FIG. 14 illustrates an example page that is rendered on the screen of the mobile device shown in FIG. 4.
Figure 13:
FIG. 13 illustrates an example page that is rendered on the screen of the mobile device shown in FIG. 3.

FIGS. 7-12 illustrate example pages rendered by mobile devices 102 or 104 with the springboard or list patterns. Form and editable form (eform) patterns can also be employed. Form and editable form patterns can be used to expose details of a business object. For example, each business object presented in a list pattern, such as the list of opportunities shown in FIGS. 11 and 12, is actionable and can lead to a more detailed view of that business object. FIGS. 13 and 14 illustrate example pages rendered by mobile devices 102 and 104, respectively in response to a user activation of the "Pinnacle Server 1" opportunity element shown in FIGS. 11 and 12. The pages illustrated in FIGS. 13 and 14 implement form patterns and provide more detailed information about a particular opportunity (i.e., Pinnacle Server).

When users activate Pinnacle Server 1 opportunity element, mobile devices 102 and 104 generate and send requests to server 106 for the Pinnacles Server 1 opportunity page. Server 106 returns separate replies that contain serializations of the Opportunity page definition merged with Pinnacle Server 1 data from model 212. Mobile devices 102 and 104 render pages 1300 and 1400 in response to receiving their respective replies. Pages 1300 and 1400 illustrate examples of a form pattern, which in one embodiment represents an intent to display elements (e.g., data of the Pinnacles Server opportunity) as shown. Both pages display the same data from the Pinnacles Server 1 opportunity of logical data model 212. However, and like pages shown in FIGS. 7-12, corresponding pages 1300 and 1400 accommodate the native look and feel of mobile devices 102 and 104, respectively.

Figures 15, 16:
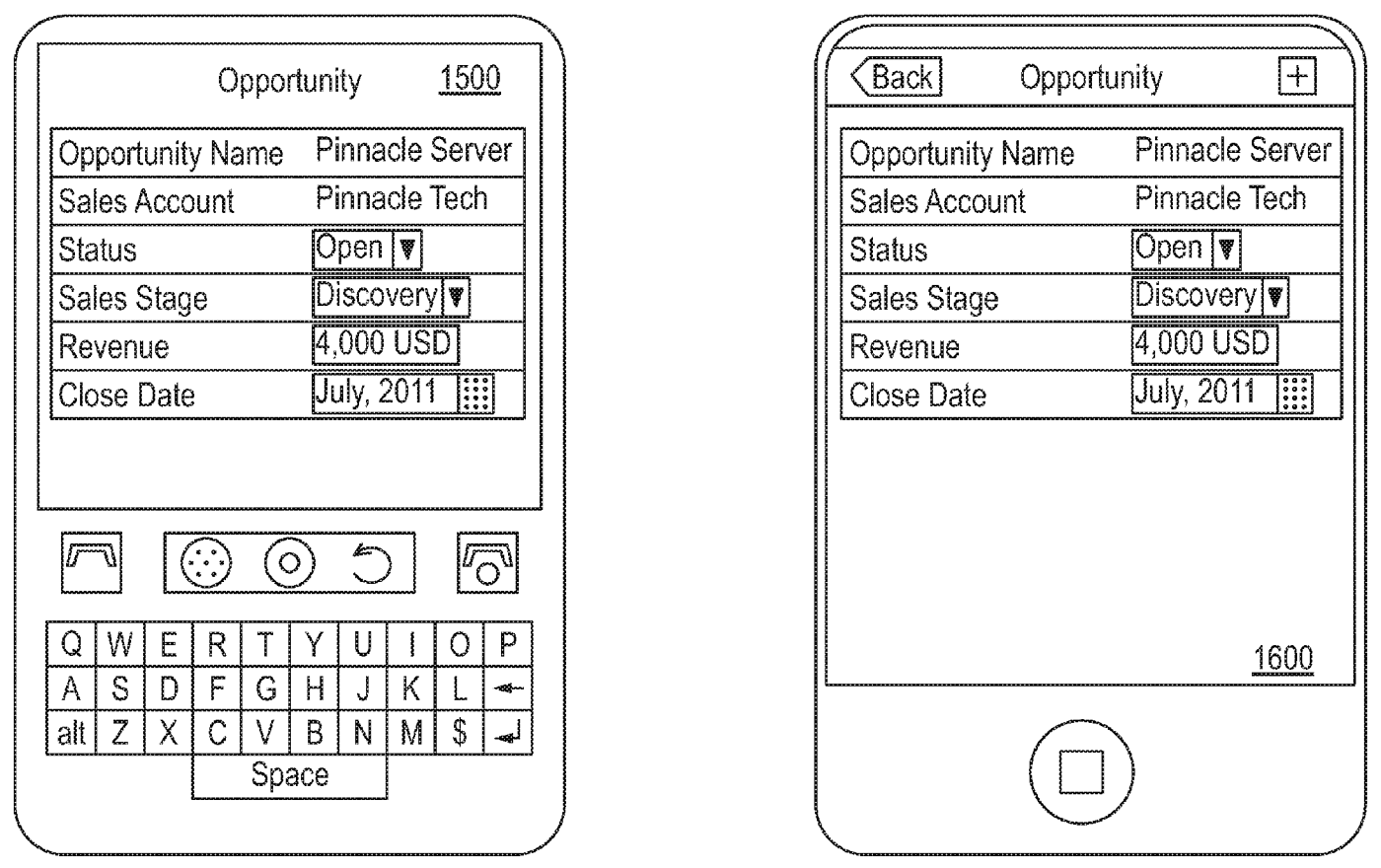

The pages displayed in FIGS. 13 and 14 represent examples of a form pattern on mobile devices 102 and 104. Form and Editable form (eform) patterns are similar. FIGS. 15 and 16 illustrate example pages 1500 and 1600 displayed on mobile devices 102 and 104, respectively, using the eform pattern. In response to activating edit button 1402 in FIG. 14, mobile device 104 sends a request for a page that can be used to edit the Pinnacle Server opportunity. CRM on server 106 replies with a serialization of the editable opportunity page definition merged with data of the Pinnacle Server 1 opportunity. Mobile device 104 deserializers the file, and with the help of CRM client 626, renders the page shown in FIG. 16. A user can modify data contained in one or more of the fields. When finished, the user activates the "Done" soft button 1602. In response, mobile device 104 generates and sends a message to server 106 that includes the modified data. Control logic 214 receives the message, and in response provides the modified data to logical data model 212.

In response to selecting an edit option from a menu (not shown) that is displayed on mobile device 102 when the user depresses trackball 318, mobile device 102 sends a request for a page that can be used to edit the Pinnacle Server 1 opportunity. Server 106 replies with a serialization of the editable opportunity page definition merged with data of the Pinnacle Server 1 opportunity, which mobile device 102 uses to render the Pinnacle Server 1 opportunity page 1500 shown in FIG. 15. A user can modify data contained in one or more of the fields. When finished, the user invokes a command for mobile device 102 to generate and send a message to server 106 that includes the modified data. Control logic 214 receives the modified data and instructs the model 212 to perform actions based on that input.

Figure 17:
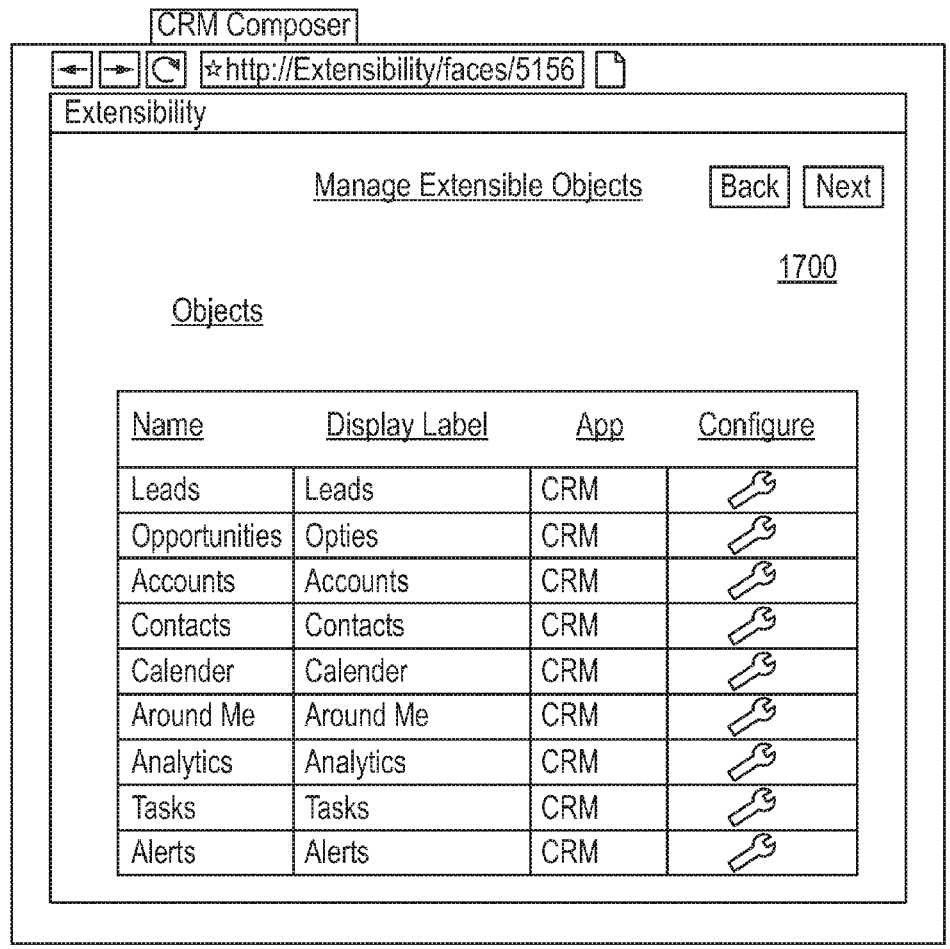
FIG. 17 illustrates an example editor that can be displayed on the screen of the computer system shown in FIG. 1.
Figure 18:
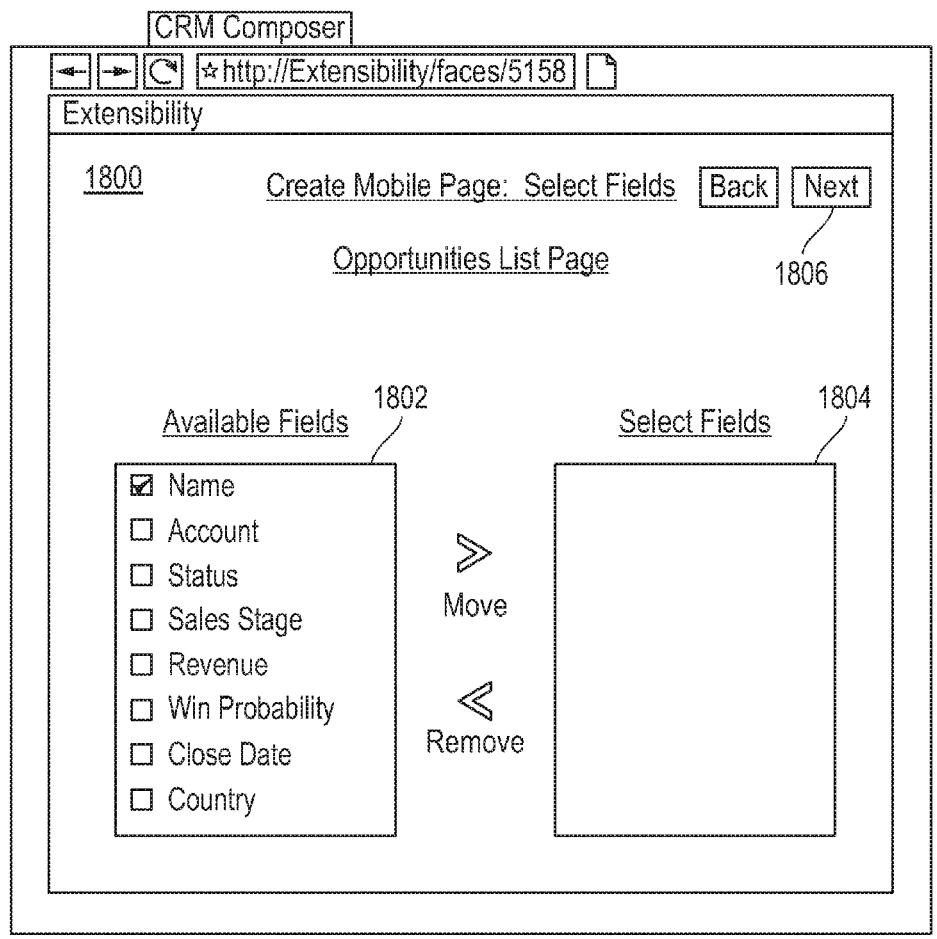
FIG. 18 illustrates an example editor that can be displayed on the screen of the computer system shown in FIG. 1.
Figure 19:
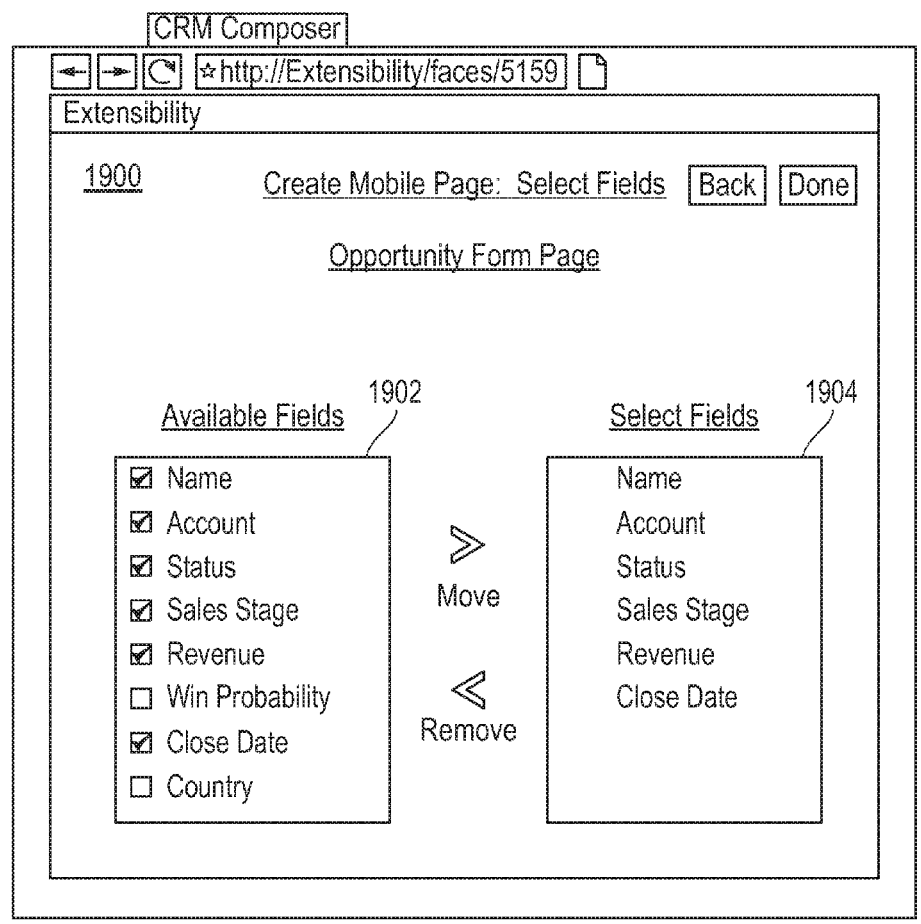
FIG. 19 illustrates an example editor that can be displayed on the screen of the computer system shown in FIG. 1.

With continuing reference to FIG. 1, computer system 114 enables an administrator to declaratively create and/or modify the CRM application definition including page definitions thereof. In FIG. 2 computer system 114 is in data communication with extensibility editor 204, which in turn is in data communication with page configurations stored within memory 202. An administrator can create and/or modify the pattern configurations stored within memory 202 using extensibility editor interfaces displayed on computer system 114. Once configured, pattern generator 206 generates page definitions for the application definition as a function of respective pattern configurations. FIGS. 17-19 illustrate graphical representations of extensibility editor interfaces displayed by computer system 114, which can be used for creating or modifying page configurations within memory 202.

An initial page configuration can be stored within memory 202 for each high level business object of logical data model 212. These page configurations should lack any information regarding the look and feel of pages displayed on mobile devices 102 or 104. The page configurations may include pattern definitions that define pattern intent, and page definitions vary according to pattern intent. A pattern definition for a list differs in structure when compared, for example, to a pattern definition for a form. Initial page configurations with a list pattern definition can be provided for the accounts, opportunities, leads, contacts, etc., of logical data model 212. Initial page configurations with a form pattern definition can be provided for account, opportunity, lead, contact, etc., of logical data model 212. Initial page configurations for other business objects of logical data model 212 may include other types of pattern definitions. For example, the around me business object of logical data module 212 may be initially created with a display of location aware entities pattern definition.

The initial page configurations can be subsequently modified with additional information to create final page configurations that can be processed by a pattern generator 206 to create page definitions within the application definition. Again, once the initial page configurations are created, the page configurations can be modified using the extensibility editor 204. FIGS. 17-19 illustrate example interfaces of extensibility editor 204.

FIG. 17 illustrates an example extensibility editor interface 1700 that an administrator can use to select one of the listed page configurations to be modified. Page configurations can be modified, for example, by adding data identifiers (e.g., field names) of objects in logical data model 212. FIG. 18 illustrates an example extensibility editor interface 1800 that is displayed on computer system 114 when the administrator selects the "Opportunities" business object page configuration of FIG. 17. Interface 1800 includes a panel 1802 that displays available fields of the Opportunities business object. In one embodiment, logical data model 212 provides extensibility editor 204 with metadata regarding each of the business objects contained within logical data model 212. This metadata may be used to populate the available-fields panel 1802 shown within FIG. 18. Interface 1800 also includes a selected fields-panel 1804 into which fields selected by the administrator can be added. Initially, the selected fields-panel 1804 is empty. However, as the administrator selects and moves available fields, the selected fields-panel 1804 populates accordingly. FIG. 18 shows the selected fields-panel 1804 after the administrator has selected and moved the Name field from panel 1802.

Once the administrator has moved all available fields of interest to the selected fields-panel 1804, the administrator can activate the next button 1806, which completes the configuration of the Opportunities page configuration. Further, activation of the next button 1806 prompts extensibility editor 204 to display extensibility editor interface 1900 (shown within FIG. 19), which is flow connected to the Opportunities page configuration. In interface 1900, the administrator can configure the Opportunity page configuration. It is noted that the page configurations may include information that defines flow relationships between related page configurations. This flow relationships information is processed to create the flow relationships between page definitions within the application definition.

As noted, FIG. 19 includes the extensibility editor interface that can be used to configure the Opportunity page configuration within memory 202. Like the interface shown in FIG. 18, interface 1900 includes an available fields-panel 1902 that lists fields that are contained in each opportunity of logical data model 212. In addition, the interface shown in FIG. 19 also includes a selected fields-panel 1904 that is initially empty. However, the administrator can select and move fields from panel 1902 to panel 1904. FIG. 19 shows the interface after an administrator has moved the Name, Account, Status, Sell Stage, Revenue, and Closed Date fields to the selected fields-panel 1904. The fields selected in interfaces 1800 and 1900 correspond to the data elements that are displayed within the example Opportunities and Opportunity page shown in FIGS. 11-12, and 13-14, respectively. More particularly, in FIGS. 11 and 12, the mobile device displays the name of each opportunity in accordance with the fields selected in interface 1800 shown in FIG. 18. Further, pages shown within FIGS. 13 and 14 illustrate the field values for the fields that were selected in the interface of FIG. 19.

Once all available fields of interest are moved to the selected fields-panel 1904, the administrator can close the extensibility editor interface, which completes modification of the opportunity page configuration. Thereafter, the pattern generator 206 can process the page configurations within memory 202 and generate the page definitions, such as those represented in memory 210. Subsequent changes to a page configuration can be made through extensibility editor 204 in much the same way as described above. When changes are made to one or more configuration pages, page definitions contained within memory 210 can be replaced with newer versions after they are regenerated by pattern generator 206. When the application definition in memory 210 is complete, users of mobile devices of 102 and 104 can request pages.

Figure 20:
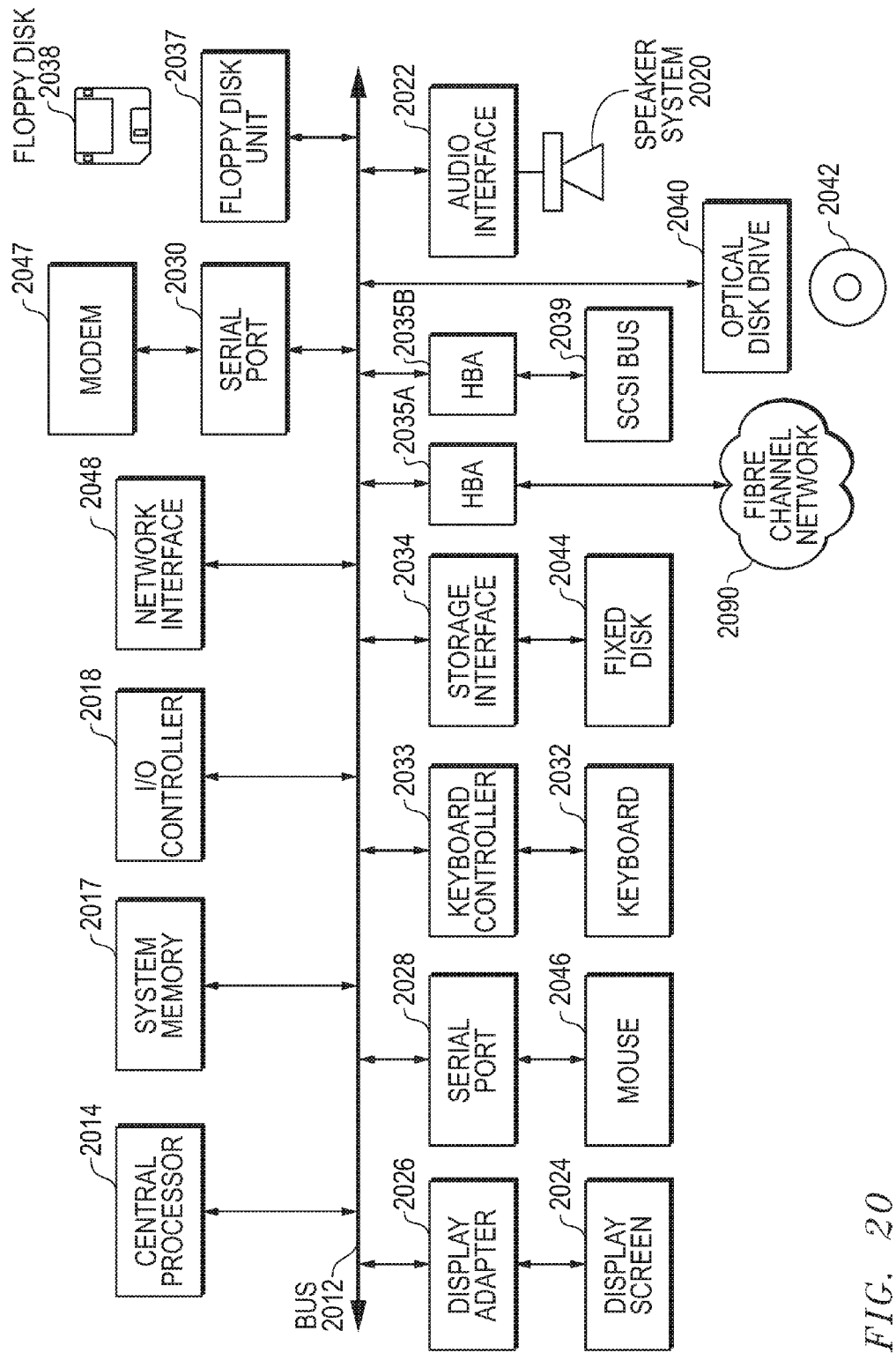
FIG. 20 is a block diagram of an example computer system that may be employed in the system of FIG. 1 or 2.

FIG. 20 depicts a block diagram of a computer system 2010 suitable for implementing the present disclosure. Computer system 2010 may be illustrative of various computer systems (e.g., servers or clients) shown in FIGS. 1 and 2. Computer system 2010 includes a bus 2012 which interconnects major subsystems of computer system 2010, such as a central processor 2014, a system memory 2017 (typically RAM, but which may also include ROM, flash RAM, or the like), an input/output controller 2018, an external audio device, such as a speaker system 2020 via an audio output interface 2022, an external device, such as a display screen 2024 via display adapter 2026, serial ports 2028 and 2030, a keyboard 2032 (interfaced with a keyboard controller 2033), a storage interface 2034, a floppy disk drive 2037 operative to receive a floppy disk 2038, a host bus adapter (HBA) interface card 2035A operative to connect with a Fibre Channel network 2090, a host bus adapter (HBA) interface card 2035B operative to connect to a SCSI bus 2039, and an optical disk drive 2040 operative to receive an optical disk 2042. Also included are a mouse 2046 (or other point-and-click device, coupled to bus 2012 via serial port 2028), a modem 2047 (coupled to bus 2012 via serial port 2030), and a network interface 2048 (coupled directly to bus 2012).

Bus 2012 allows data communication between central processor 2014 and system memory 2017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 2010 are generally stored on and accessed via a computer readable medium, such as a hard disk drive (e.g., fixed disk 2044), an optical drive (e.g., optical drive 2040), a floppy disk unit 2037, or other storage medium. Additionally, applications can be in the form of electronic signals modulated in accordance with the application and data communication technology when accessed via network modem 2047 or interface 2048.

Storage interface 2034, as with the other storage interfaces of computer system 2010, can connect to a standard computer readable medium for storage and/or retrieval of information, such as a fixed disk drive 2044. Fixed disk drive 2044 may be a part of computer system 2010 or may be separate and accessed through other interface systems. Modem 2047 may provide a direct connection to a remote server via a telephone link or to the Internet via an internet service provider (ISP). Network interface 2048 may provide a direct connection to a remote server via a direct network link to the Internet via a POP (point of presence). Network interface 2048 may provide such connection using wireless techniques, including digital cellular telephone connection, Cellular Digital Packet Data (CDPD) connection, digital satellite data connection or the like.

The operation of a computer system such as that shown in FIG. 20 is readily known in the art and is not discussed in detail in this application. Code for implementing a CRM can be stored in computer-readable storage media such as one or more of system memory 2017, fixed disk 2044, optical disk 2042, or floppy disk 2038. Memory 2020 is also used for storing temporary variables or other intermediate information during the execution of instructions by the processor 2010. The operating system provided on computer system 2010 may be MS-DOS®, MS-WINDOWS®, OS/2®, UNIX®, Linux®, or another known operating system.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
in response to receiving a request from a mobile device, accessing a plurality of tables within a database to retrieve a first copy of data elements;
in response to receiving the request from the mobile device, accessing a memory to retrieve a first copy of a first page definition that comprises a first pattern definition;
merging the first copy of the first page definition and the first copy of the data elements to create a first merged result;
a server generating and transmitting a reply to the mobile device via a wireless communication link;
the mobile device rendering a first page on a screen thereof in response to receiving the reply, wherein the first page comprises visual representations of the first copy of the data elements, and wherein the first page presents the visual representations in a first pattern corresponding to the first pattern definition;
in response to receiving a second request from the mobile device, the server generating and transmitting a second reply to the mobile device via the wireless communication link, wherein the second reply comprises a first copy of second data elements retrieved from a second plurality of tables in the database:

the mobile device rendering a second page on the screen thereof in response to receiving the second reply, wherein the second page comprises visual representations of the first copy of the second data elements, and wherein the second page presents its visual representations in a second pattern that is distinct from the first pattern.

2. The method of claim 1 further comprising:

in response to receiving a request from another mobile device, the server generating and transmitting another reply to the other mobile device via another wireless communication link, wherein the other reply comprises a second copy of the data elements from the plurality of tables;

the other mobile device rendering another first page on a screen thereof in response to receiving the other reply, wherein the other first page comprises visual representations of the second copy of the data elements in the first pattern.

3. The method of claim 2:

serializing the first merged result for transmission in the reply;

wherein generating the other reply comprises merging a second copy of the first page definition with the second copy of the data elements to create another first merged result;

serializing the other first merged result for transmission in the other reply.

4. The method of claim 3 wherein the first page definition is one of several page definitions in the memory, and wherein the method further comprises selecting the first page definition from among the several page definitions based on information contained in the request.

5. The method of claim 4 wherein the first page definition lacks any information regarding the mobile device or the other mobile device.

6. The method of claim 2 wherein a look and feel of the first page is different from a look and feel of the other first page.

7. The method of claim 1 further comprising:

in response to receiving another second request from the other mobile device, the server generating and transmitting another second reply to the other mobile device via the other wireless communication link, wherein the other second reply comprises a second copy of the second data elements;

the other mobile device rendering another second page on the screen thereof in response to receiving the other second reply, wherein the other second page comprises visual representations of the second copy of the second data elements in the second pattern;

wherein a look and feel of the second page is different from a look and feel of the other second page;

wherein the look and feel of the first page is the same as the look and feel of the second page;

wherein the look and feel of the other first page is the same as the look and feel of the other second page.

8. The method of claim 7:

wherein generating the second reply comprises merging a first copy of a second page definition with the first copy of the second data elements to create a second merged result;

serializing the second merged result for transmission in the second reply;

wherein generating the other second reply comprises merging a second copy of the second page definition with the second copy of the second data elements to create another second merged result;

serializing the other second merged result for transmission in the other second reply.

9. The method of claim 8 wherein the second page definition comprises a second pattern definition that defines the second pattern.

10. The method of claim 1 wherein at least two of the first copy of data elements are retrieved from respective tables of the plurality of tables.

11. A method comprising:

a mobile device generating and transmitting a request to a server via a wireless communication link in response to user activation of an active element displayed on a screen of the mobile device;

the mobile device receiving a reply from the server via the wireless communication link, wherein the reply comprises first pattern information retrieved from a memory that stores the first pattern information and a second pattern information, and wherein the reply comprises a first copy of data elements retrieved from a plurality of tables of a database that is accessible by a customer relationship management (CRM) system;

the mobile device rendering a first page on the screen in response to receiving the reply, wherein the first page comprises visual representations of the first copy of the data elements, and wherein the first page presents the visual representations in a first pattern corresponding to the first pattern information;

the mobile device generating and transmitting a second request to the server via the wireless communication link;

the mobile device receiving a second reply from the server via the wireless communication link, wherein the second reply comprises the second pattern information and a first copy of second data elements retrieved from a second plurality of tables in the database;

the mobile device rendering a second page on the screen in response to receiving the second reply, wherein the second page comprises visual representations of the second data elements in a second pattern corresponding to the second pattern information that is distinct from the first pattern.

12. The method of claim 11 further comprising:

another mobile device generating and transmitting another request to the server via another wireless communication link in response to user activation of another active element displayed on a screen of the other mobile device;

the other mobile device receiving another reply from the server via the other wireless communication link, wherein the other reply comprises a second copy of the data elements;

the other mobile device rendering another first page on its screen in response to receiving the other reply, wherein the other first page comprises visual representations of the second copy of the data elements in the first pattern.

13. The method of claim 12 further comprising:

the mobile device generating and transmitting the second request to the server via the wireless communication link in response to user activation of an active element presented by the first page.

14. The method of claim 13 further comprising:

the other mobile device generating and transmitting another second request to the server via the other wireless communication link in response to user activation of another active element presented by the other first page;

the other mobile device receiving another second reply from the server via the other wireless communication link, wherein the other second reply comprises a second copy of the second data elements;

the other mobile device rendering another second page on its screen in response to receiving the other second reply, wherein the other second page comprises visual representations of the second copy of the second data elements in the second pattern.

15. The method of claim 14:

wherein the reply and the other reply lack any information regarding the mobile device or the other mobile device;

wherein the second reply and the other second reply lack any information regarding the mobile device or the other mobile device.

16. The method of claim 14:

wherein a look and feel of the first page is different from a look and feel of the other first page;

wherein a look and feel of the second page is different from a look and feel of the other second page;

wherein the look and feel of the first page is the same as the look and feel of the second page;

wherein the look and feel of the other first page is the same as the look and feel of the other second page.

17. The method of claim 16:

wherein the reply lacks any information regarding the look and feel of the first page;

wherein the other reply lacks any information regarding the look and feel of the other first page.

18. A non-transitory memory comprising instructions executable by a mobile device, wherein the mobile device is configured to implement a method in response to executing the instructions, the method comprising:

generating and transmitting a request to a server via a wireless communication link in response to user activation of an active element displayed on a screen of the mobile device;

rendering a first page on the screen in response to receiving a reply from the server via the wireless communication link, wherein the reply comprises first pattern information and data elements retrieved from a plurality of tables within a database, wherein the first page comprises visual representations of the data elements in a first pattern corresponding to the first pattern information;

generating and transmitting a second request to the server via the wireless communication link;

the mobile device rendering a second page on the screen in response to receiving a second reply from the server via the wireless communication link, wherein the second reply comprises second pattern information and second data elements retrieved from a second plurality of tables within the database, wherein the second page comprises visual representations of the second data elements, and wherein the second page presents its visual representations in a second pattern corresponding to the second pattern information that is distinct from the first pattern.

19. The non-transitory memory of claim 18 wherein the second request is generated and transmitted to the server via the wireless communication link in response to user activation of an active element presented by the first page.

20. A method comprising:

transmitting instructions to a memory for storage therein, wherein a mobile device is configured to implement a method in response to executing the instructions, the method comprising:

generating and transmitting a request to a server via a wireless communication link in response to user activation of an active element displayed on a screen of the mobile device;

rendering a first page on the screen in response to receiving a reply from the server via the wireless communication link, wherein the reply comprises first pattern information and data elements retrieved from a plurality of tables of a database that is accessible by a customer relationship management (CRM) system, wherein the first page comprises visual representations of the data elements, and wherein the first page presents the visual representations of the data elements in a list pattern corresponding to the first pattern information;

generating and transmitting a second request to the server via the wireless communication link;

the mobile device rendering a second page on the screen in response to receiving a second reply from the server via the wireless communication link, wherein the second reply comprises second pattern information and second data elements retrieved from a second plurality of tables within the database, wherein the second page comprises visual representations of the second data elements, and wherein the second page presents its visual representations in a second pattern corresponding to the second pattern information that is distinct from the first pattern.

21. The method of claim 20 wherein the second request is generated and transmitted to the server via the wireless communication link in response to user activation of an active element presented by the first page.

* * * * *